J. W. PRESTON.
Corn-Husking Implement.
No. 206,609.　　　　　　　Patented July 30, 1878.
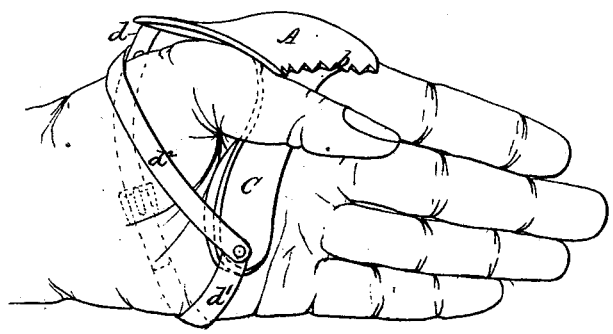
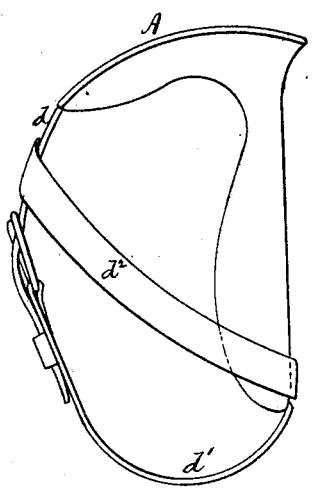
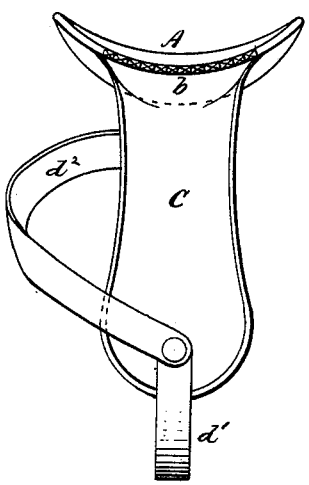

UNITED STATES PATENT OFFICE.

JOHN W. PRESTON, OF BUFFALO, NEW YORK.

IMPROVEMENT IN CORN-HUSKING IMPLEMENTS.

Specification forming part of Letters Patent No. 206,609, dated July 30, 1878; application filed January 10, 1878.

*To all whom it may concern:*

Be it known that I, JOHN W. PRESTON, of the city of Buffalo, in the county of Erie and State of New York, have invented a new and useful Improvement in Hand Corn-Huskers, of which the following is a specification, reference being had to the accompanying drawings.

The object of my invention is to provide a means for protecting the hand while husking corn; and it consists in a metallic plate, made of peculiar shape, fitting snugly on the top of the hand between the thumb and forefinger, and extending down into the palm of the hand, and provided with a sharpened or serrated edge for severing the stalk from the ear, as will be hereinafter fully set forth.

In the accompanying drawings, Figure 1 represents a perspective view of my improved implement attached to the hand. Fig. 2 is a side elevation thereof, and Fig. 3 a front view.

Like letters of reference refer to like parts in the several figures.

A represents the top plate of my improved device, slightly curved upward at its sides and downward at its rear, so as to fit snugly on the top of the hand between the thumb and forefinger. It is provided on its inner edge with teeth $b$. C is the shank, extending downwardly from the inner edge of the top plate, and suitably curved, so that it can be conveniently grasped and held in the palm of the hand. $d$ is a strap, pivoted to the rear end of the top plate, and extending over the back of the hand, and buckled to a similar strap, $d^1$, pivoted to the lower end of the shank. $d^2$ is a short strap, pivoted to the lower end of the shank and extending up over the hand, and pivoted to the strap $d$, whereby the device is securely fastened to the hand and held in proper place.

In husking corn by hand, the hand in which the ear of corn is held soon becomes bruised and sore from the ear of corn rubbing against the top of the hand while breaking it from the stalk. As my device is intended to be applied to the hand in which the stalk is held, this difficulty is overcome, and the ear is severed from the stalk by grasping the stalk tightly between the fingers and shank C, the teeth or sharpened edge of the top plate penetrating the stalk, so that by a slight transverse movement of the ear of corn the stalk is readily removed.

What I claim as my invention, and desire to secure by Letters Patent, is—

As a new article of manufacture, a corn-husking implement composed of the top plate A and shank C, arranged as shown, and having a sharpened or serrated edge, $b$, substantially as set forth.

J. W. PRESTON.

Witnesses:
 JNO. J. BONNER,
 CHAS. J. BUCHHEIT.